Figure 1:
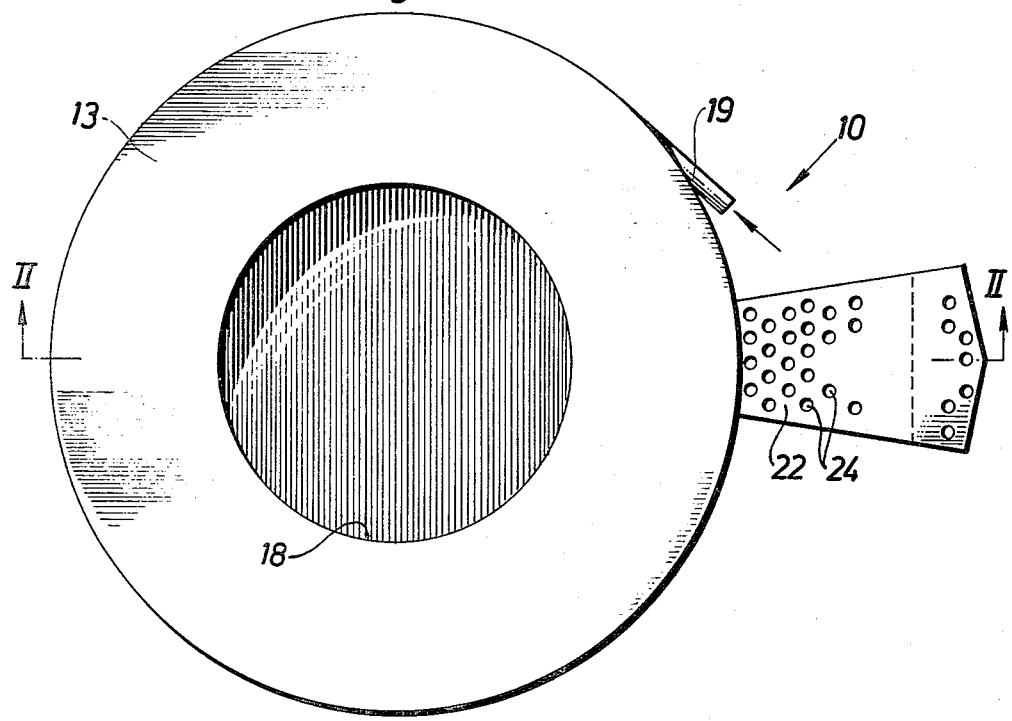

United States Patent [19]

Lindström

[11] 4,229,125
[45] Oct. 21, 1980

[54] APPARATUS FOR SEPARATING OBJECTS HAVING A TENDENCY TO HITCH TO EACH OTHER

[75] Inventor: Jan Lindström, Täby, Sweden

[73] Assignee: Tekno-Detaljer Sture Carlsson AB, Vallingby, Sweden

[21] Appl. No.: 960,308

[22] Filed: Nov. 13, 1978

[30] Foreign Application Priority Data

Nov. 14, 1977 [SE] Sweden .............................. 7712840

[51] Int. Cl.$^3$ .............................................. B65G 51/02
[52] U.S. Cl. .................................... 406/137; 198/953
[58] Field of Search ................ 198/953, 493; 221/278, 221/200; 414/116, 417, 304; 406/136, 137, 157, 83, 175, 179

[56] References Cited

U.S. PATENT DOCUMENTS

| 726,030 | 4/1903 | Cowley | 406/179 |
| 2,219,208 | 10/1940 | Knight | 406/137 |
| 3,346,305 | 10/1967 | Heymann | 406/137 |
| 4,035,029 | 7/1977 | Lindström et al. | 406/137 |
| 4,106,817 | 8/1978 | Tsuzuku et al. | 406/175 X |

Primary Examiner—James L. Rowland
Attorney, Agent, or Firm—Fleit & Jacobson

[57] ABSTRACT

An apparatus for separating entangled objects from each other comprises an upstanding cylindrical receptacle which contains a separation chamber of annular cross-section formed between a cylindrical outer wall and an inner wall located in coaxial relationship to the outer wall. A mechanism is provided for generating a generally helical flow of air along the inner side of the outer wall in order to move objects, fed into the receptacle, from the lower portion of the separation chamber to a discharge opening located at a higher level. In order to make it possible to feed the objects to the apparatus in an expedient manner permitting an efficient utilization of its available capacity, the receptacle is provided with a reception chamber located radially inside the inner wall and provided with an entrance opening for the objects at its upper end, while, at its lower end, it is connected to the surrounding separation chamber by a circumferentially extending opening formed between the lower end of the inner wall and the bottom of the receptacle.

7 Claims, 2 Drawing Figures

U.S. Patent  Oct. 21, 1980  4,229,125

APPARATUS FOR SEPARATING OBJECTS HAVING A TENDENCY TO HITCH TO EACH OTHER

In the mechanical and electrical industry, one type of components frequently used in the various apparatus and equipments manufactured is springs, especially coiled springs. However, the tendency of springs to hitch to each other has caused severe difficulties in connection with the installation thereof in said apparatus and equipments. Therefore, during recent years, various apparatus have been proposed, which may be used to accomplish a separation of entangled springs from each other in order to simplify and facilitate the subsequent use of the individual springs.

The present invention relates to an apparatus for separating entangled objects from each other, such as springs or other objects having a tendency to hitch to each other. More particularly, the invention relates to such an apparatus of the kind, comprising an upstanding receptacle which is generally symmetrical about a substantially vertical axis and contains a separation chamber of annular cross-section formed between a generally cylindrical outer wall and an inner wall located radially inside the outer wall and in coaxial relationship thereto, and means for generating a generally helical flow of air along the inner side of the outer wall in order to move objects, fed into the receptacle, from the lower portion of the separation chamber to a discharge opening located at a higher level, the outer wall being arranged to have a braking or disturbing effect on the objects carried by said air flow when they contact said wall.

An apparatus of said kind is previously known through German Offenlegungsschrift No. 2 544 934. In practice, this known apparatus has proved to result in a very efficient separation. Especially, it has been found that, if the inner side of the outer wall is provided with surface irregularities formed by a plurality of welding spots, the treated objects will become subjected to repeated shocks and vibrations as they are brought to contact the inner side of the outer wall repeatedly during their movement from the bottom of the separation chamber towards the discharge opening. Hereby entangled objects will successively become separated from each other. However, a disadvantage of the known apparatus is that it has been difficult to feed the objects to the apparatus in an expedient manner permitting an efficient utilization of the available capacity of the apparatus. The present invention has for its object to provide an improved apparatus of said kind which offers an advantageous solution of the problem above referred to.

For this object, the invention suggests that the receptacle should further contain a reception chamber for objects fed into the the receptacle, said reception chamber being located radially inside the inner wall and provided with an entrance opening for said objects at its upper end, while, at its lower end, it is connected to the surrounding separation chamber by means of a circumferentially extending opening formed between the lower end of the inner wall and the bottom of the receptacle and adapted to permit objects received in the reception chamber to pass from said chamber to the separation chamber through said opening.

The construction of the apparatus suggested according to the invention makes it possible continuously to maintain in the reception chamber a comparatively large quantity of objects intended to be subjected to a separating treatment in the surrounding separation chamber. Hereby such objects may be fed continuously to the separation chamber at a rate corresponding to the rate at which treated objects are discharged from said chamber through the discharge opening, meaning that the available capacity of the apparatus may be fully utilized.

In the region of the reception chamber, the bottom of the receptacle may preferably be provided with a raised portion which, in order to promote the transfer of objects from the reception chamber to the separation chamber via the circumferentially extending opening provided between said chambers, has an upper surface slanting towards said opening. Such an arrangement results in that objects received in the reception chamber may slide under the action of gravity towards said opening which leads to the separation chamber. Said raised portion may suitably be formed generally as a segment of a sphere or it may be of generally conical configuration.

The apparatus may advantageously be provided with a discharge pipe connected to the discharge opening and extending in a generally radial outward direction therefrom. In order to facilitate a reduction of the speed at which objects are thrown out from the discharge pipe, the invention suggests that the discharge pipe should have a perforated wall. Hereby a substantial portion of the air flowing from the separation chamber into the discharge pipe through the discharge opening may be drained off through the perforation holes provided in the wall of said pipe. This means that only a minor portion of the incoming air flow will reach the outlet opening of the discharge pipe.

Figure 2:
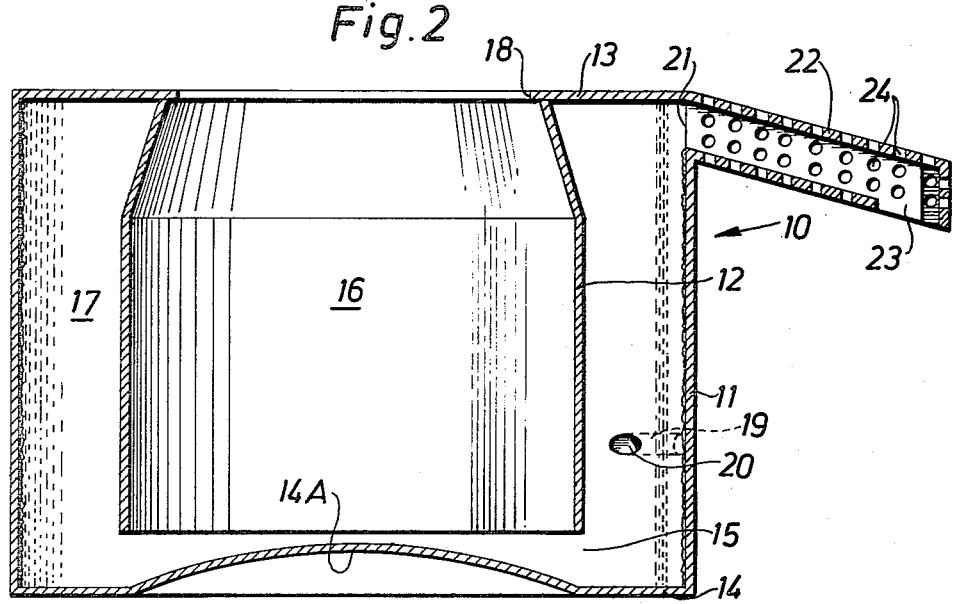

Below the invention will be described in further detail, reference being had to the accompanying drawings, in which:

FIG. 1 shows a top plan view of an apparatus according to one embodiment of the invention, selected by way of example, while FIG. 2 is a side elevation, in section along line II—II in FIG. 1.

In the drawing, reference numeral 10 generally designates an upstanding receptacle comprising an outer cylindrical wall 11 and an inner wall 12 arranged in coaxial relationship to said outer wall and consisting of an upper frustoconical portion and a low cylindrical portion. The upper end of inner wall 12 is connected to the cover 13 of the receptacle, while the lower end of inner wall 12 is located at some distance above the bottom 14 of the receptacle. Hereby a circumferentially extending opening 15 is formed between the lower end of wall 12 and bottom 14. Said opening connects the space 16 located radially inside the inner wall 12 and the annular space 17 formed between the two walls 11 and 12. Cover 13 is provided with a central opening 18 through which objects intended to be subjected to a separation treatment may be fed into space 16 which constitutes a reception chamber. In the region of reception chamber 16, bottom 14 is provided with a raised portion 14A formed as a segment of a sphere. Since the upper surface of raised portion 14A slants towards opening 15, objects received in the reception chamber 16 may slide under the action of gravity along said surface towards opening 15 and then pass through said opening into the lower portion of annular space 17 which constitutes a separation chamber.

Reference numeral 19 designates a tangentially extending tube piece which leads to an opening 20 in outer wall 11. Tube piece 19 and opening 20 form an inlet through which pressurized air may be fed into separation chamber 17 from a suitable source (not shown) connected to tube piece 19 through a flexible hose or similar means. In practice, tube piece 19 may be replaced by a threaded nipple in which a suitable nozzle may be inserted. As can be seen from FIG. 2, opening 20 and tube piece 19 are both located at a comparatively large distance from the bottom 14 of the receptacle. At its upper end, outer wall 11 is provided with a discharge opening 21 from which a short discharge pipe 22 extends in a generally radial outward direction. As can be seen from FIG. 2, discharge pipe 22 is slightly inclined towards its outer end at which it is provided with a downward outlet opening 23.

The function and operation of the apparatus above described will now be explained in short terms. Objects to be subjected to a separation treatment are fed into the reception chamber 16 through entrance opening 18. From said chamber the supplied objects may successively pass through opening 15 into separation chamber 17 to which pressurized air is fed through tube piece 19 and opening 20. Before the supply of pressurized air is started, if desired, entrance opening 18 may be closed, for instance by a suitable cover (not shown). Alternatively, the apparatus may be provided with a feed hopper (not shown) leading into opening 18 and at its lower end provided with means adapted both to control the rate at which objects are fed into the reception chamber 16 and, if desired, also to form means for closing opening 18. When the supply of pressurized air is started, an upward whirllike flow of air will be generated in separation chamber 17 along the inner side of outer wall 11. This air flow will impart a motion to objects located in the lower portion of chamber 17 and cause said objects to move along generally helical paths along the inner side of wall 11. As schematically illustrated in the drawing, on its inner side outer wall 11 may be provided with surface irregularities, for instance formed by a plurality of welding spots. When the objects carried by the air flow contact wall 11 they will be subjected to shocks and vibrations which will occur repeatedly during the movement of said objects from bottom 14 to discharge opening 21 and cause a successive separation of entangled objects from each other. The surface irregularities on the inner side of wall 11 will thus disturb the movements of the objects and prevent them from sliding smoothly along wall 11. When the objects reach discharge opening 21 they are discharged through said opening, whereupon they pass through discharge pipe 22 to outlet opening 23 from which they may fall freely down on a collector or a conveyor. In order to prevent the discharged objects from being thrown out at an unsuitable high speed through opening 23, the discharge pipe 22 may be provided with a plurality of perforation holes 24 serving to drain off a substantial portion of the air flowing into discharge pipe 22 before said air reaches outlet opening 23.

Reception chamber 16 and opening 15 provided between said chamber and separation chamber 17 make it possible to utilize the capacity of the apparatus in an efficient manner as a considerable quantity of objects to be treated in the separation chamber may continuously be maintained in the reception chamber, irrespectively of whether the objects are fed intermittently or continuously into the reception chamber.

The invention is not restricted to the embodiment illustrated in the drawing and described above. Instead, many modifications are possible within the scope of the invention. For instance, the raised portion 14A of bottom 14 may be of generally conical configuration instead of being formed as a segment of a sphere.

I claim:

1. An apparatus for separating entangled objects from each other, such as springs or other objects having a tendency to hitch to each other, said apparatus comprising an upstanding receptacle which is generally symmetrical about a substantially vertical axis and contains a separation chamber of annular cross-section formed between a generally cylindrical outer wall and an inner wall located radially inside the outer wall and in coaxial relationship thereto, and means for generating a generally helical flow of air along the inner side of the outer wall in order to move objects, fed into the receptacle, from the lower portion of the separation chamber to a discharge opening located at a higher level, the outer wall being arranged to have a braking or disturbing effect on the objects carried by said air flow when they contact said wall, a reception chamber for objects fed into the receptacle extending radially inside the inner wall from an entrance opening for said objects provided at the upper end of the receptacle and along substantially the entire vertical height of the receptacle to a position near the lower end of the separation chamber, where the reception chamber is connected to the surrounding separation chamber by means of a circumferentially extending opening formed between the lower end of the inner wall and the bottom of the receptacle and adapted to permit objects received in the reception chamber to pass from said chamber to the separation chamber through said opening.

2. An apparatus according to claim 1, wherein, in the region of the bottom of the reception chamber, the bottom of the receptacle is formed with a raised portion which, in order to promote transfer of objects from the reception chamber to the separation chamber via the circumferentially extending opening provided between said chambers, has an upper surface slanting towards said opening, the height of the raised portion being substantially less than the width thereof.

3. An apparatus according to claim 2, wherein said raised portion is formed generally as a segment of a sphere.

4. An apparatus according to claim 2, wherein said raised portion is of generally conical configuration.

5. An apparatus according to claim 1, including a discharge pipe connected to the discharge opening and extending in a generally radial outward direction therefrom, wherein said discharge pipe has a perforated wall.

6. An apparatus according to claim 1, wherein said inner wall of the separation chamber defines the reception chamber.

7. An apparatus according to claim 1, wherein the volume of said reception chamber is such that a considerable quantity of objects to be treated in the separation chamber may be maintained in said reception chamber.

* * * * *